United States Patent
Seya et al.

(10) Patent No.: US 9,547,301 B2
(45) Date of Patent: Jan. 17, 2017

(54) MACHINING SUPPORT APPARATUS AND MACHINING SUPPORT SYSTEM

(71) Applicant: Mitsubishi Hitachi Power Systems, Ltd., Yokohama, Kanagawa (JP)

(72) Inventors: Nobuhisa Seya, Hitachi (JP); Daisuke Igarashi, Hitachi (JP); Yohei Maekawa, Hitachi (JP); Katsuto Numayama, Takahagi (JP)

(73) Assignee: Mitsubishi Hitachi Power Systems, Ltd., Yokohama (JP)

( * ) Notice: Subject to any disclaimer, the term of this patent is extended or adjusted under 35 U.S.C. 154(b) by 418 days.

(21) Appl. No.: 13/943,493

(22) Filed: Jul. 16, 2013

(65) Prior Publication Data
US 2014/0025192 A1    Jan. 23, 2014

(30) Foreign Application Priority Data
Jul. 17, 2012 (JP) .................................. 2012-158653

(51) Int. Cl.
G05B 19/4063    (2006.01)
G05B 19/4069    (2006.01)
G05B 19/4061    (2006.01)

(52) U.S. Cl.
CPC ....... *G05B 19/4069* (2013.01); *G05B 19/4061* (2013.01); *G05B 19/4063* (2013.01)

(58) Field of Classification Search
CPC ............ G05B 19/4063; G05B 19/4061; G05B 19/4069
USPC ............. 700/159, 173, 182, 184; 703/1, 6, 7
See application file for complete search history.

(56) References Cited

U.S. PATENT DOCUMENTS

| 4,821,201 A | * | 4/1989 | Kawamura | ........ G05B 19/4061 700/177 |
| 5,710,709 A | * | 1/1998 | Oliver | ................ G05B 19/4067 700/184 |
| 6,885,984 B1 | | 4/2005 | Suzuki et al. | |

(Continued)

FOREIGN PATENT DOCUMENTS

| EP | 0 250 597 A1 | 1/1988 |
| GB | 2 117 929 A | 10/1983 |

(Continued)

OTHER PUBLICATIONS

European Search Report dated Jul. 3, 2015 (Eight (8) pages).

(Continued)

*Primary Examiner* — Charles Kasenge
(74) *Attorney, Agent, or Firm* — Crowell & Moring LLP

(57) ABSTRACT

In order to easily verify an operation of the machine tool, a machining support apparatus includes a machining monitoring unit 112, a simulation processing unit 113, and a display unit 150. The machining monitoring unit 112, upon receiving a notification indicating detection of a simulation start code programmed in a machining program from a machine tool controller controlling a machine tool via a communication device 130, renders the machine tool controller to stop the machine tool. The simulation processing unit 113 simulates instructions from the simulation start code to a simulation end code in the machining program, while the machine tool is stopped. And the display unit 150 displays a simulation performed in the simulation processing unit.

6 Claims, 15 Drawing Sheets

(56) References Cited

U.S. PATENT DOCUMENTS

| | | | | |
|---|---|---|---|---|
| 7,487,004 | B2* | 2/2009 | Shibui | G05B 19/40938 234/59 |
| 7,805,285 | B2* | 9/2010 | Fukaya | G05B 19/4069 700/179 |
| 7,847,506 | B2* | 12/2010 | Ogawa | G05B 19/4061 318/560 |
| 8,126,585 | B2* | 2/2012 | Yamaguchi | G05B 19/4061 700/178 |
| 8,374,718 | B2* | 2/2013 | Takahashi | G05B 19/4069 318/568.15 |
| 8,589,122 | B2* | 11/2013 | Nagatsuka | G05B 19/4069 703/1 |
| 9,069,347 | B2* | 6/2015 | Kettemer | G05B 19/4069 |
| 2008/0103741 | A1* | 5/2008 | Fukaya | G05B 19/4069 703/7 |
| 2009/0198366 | A1* | 8/2009 | Schneider | G05B 19/4069 700/110 |
| 2009/0240482 | A1 | 9/2009 | Naganawa | |
| 2009/0265030 | A1* | 10/2009 | Huang | G05B 19/4068 700/182 |
| 2010/0087948 | A1* | 4/2010 | Yamaguchi | G05B 19/4069 700/178 |
| 2010/0153073 | A1* | 6/2010 | Nagatsuka | G05B 19/4069 703/1 |
| 2011/0035044 | A1* | 2/2011 | Takahashi | G05B 19/4069 700/178 |
| 2012/0221137 | A1* | 8/2012 | Kettemer | G05B 19/4061 700/108 |

FOREIGN PATENT DOCUMENTS

| | | |
|---|---|---|
| JP | 06-095724 | 4/1994 |
| JP | 11-277371 | 10/1999 |
| JP | 2004-062613 | 2/2004 |
| JP | 2005-092654 | 4/2005 |
| JP | 2008-052749 | 3/2008 |
| JP | 2009-230571 | 10/2009 |
| JP | 2010-218036 A | 9/2010 |

OTHER PUBLICATIONS

Keichmann et al., "Grafisches NC-Testsystem zur Umfassenden Simulation" Werkstatt and Betrieb, Carl Hanser Verlag GmbH & Co. KG, vol. 129, No. 1/02, Feb. 1, 1996, XP000584023, pp. 26-29 (Four (4) pages).

Japanese Office Action dated Nov. 9, 2015 (3 pages), from corresponding Japanese Patent Appl. No. 2012-158653.

* cited by examiner

Step name: ZZZ

Workpiece name: A        Jig name: B1 ☐

Mounting method: A1 ☑   Placing position: B2 ☐

Machining portion: A2 ☐  Mounting direction: B3 ☐

Tool name: A3 ☐          Mounting position: B4 ☐
⋮                        ⋮
320                      320

Workpiece origin:        250.0

Origin difference value: 120.3
⋮

MACHINING SUPPORT APPARATUS AND MACHINING SUPPORT SYSTEM

CROSS REFERENCE TO RELATED APPLICATION

The present application claims benefit of the filing date of Japanese Patent Application No. JP2012/158653 filed on Jul. 17, 2012 which is incorporated herein by reference.

FIELD OF THE INVENTION

The present invention relates to a machining support apparatus, which supports machining according to a machining program, and a machining support system.

DESCRIPTION OF RELATED ART

A machining using a NC (Numerical Control) machine (hereinafter referred to as a machine tool) proceeds automatically according to an NC program.

As a monitoring system of such a machine tool, a robotic offline programming device or the like, being capable of simulation by performing the same operation as that of the actual machine, is disclosed (Japanese Patent Application Publication No. 2010-218036 A, for example).

Problems to be Solved by the Invention

At the machine tool described above, the machining proceeds automatically according to the NC program. It is preferable that the machining proceeds automatically from the viewpoint of improving machining efficiency, but, if there is an error in the NC program, there is a problem that the machining proceeds without the error being noticed.

In addition, in order to perform accurate machining, there are cases where the user of the machine corrects set values in the middle of the processing. At this time, there is a risk that an incorrect value is entered, causing an incorrect machining as entered.

Incidentally, in order to prevent the machining from proceeding in a state where there is an error in the NC program or a mounted tool is incorrect, a dry run (insubstantial work) is performed. By operating the tool according to the NC program in a state that the tool is distant from the workpiece, it is intended to confirm whether or not there is an error in the NC program.

However, as the dry run is performed in the state that the tool is away from the workpiece, that is, in a state where the coordinate values of the tool are shifted, it is difficult to confirm whether the correct coordinate values are inputted.

In order to solve such a problem, there is a method called soft dry run to simulate a dry run in software.

However, if the soft dry run is performed from the beginning to the end of the processing, it is not practical because it takes a lot of time.

The present invention has been made in view of such a background, intending to facilitate verifying an operation of a machine tool.

BRIEF SUMMARY OF THE INVENTION

In order to solve the problems described above, a simulation start code is inserted in the machining program, according to the present invention, and when the simulation start code is detected, the machining program below the simulation start code is simulated in a state that the machine tool is stopped, and the simulation is displayed on the display unit.

According to the present invention, it is possible to verify a machining of a machine tool easily.

BRIEF DESCRIPTION OF THE DRAWINGS

FIG. 10 is an example of an input screen for machining preparation information according to the present embodiment.

FIG. 11 is an example of an input screen for required material information according to the present embodiment.

DETAILED DESCRIPTION OF THE INVENTION

Next, a detailed description will be given of an aspect for implementing the present invention (hereinafter referred to as an "embodiment"), with reference to the accompanying drawings.

System Configuration

Figure 1:
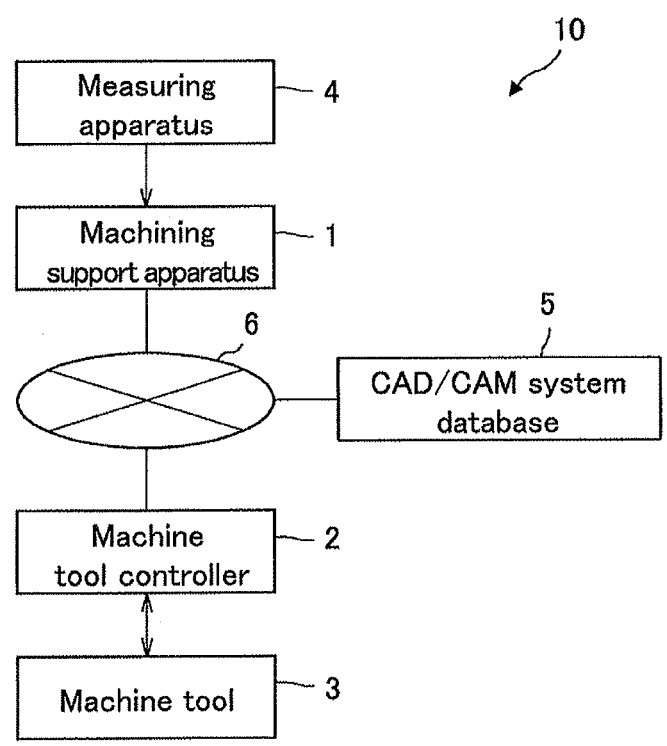
FIG. 1 is a diagram showing an exemplary configuration of the machining support system according to the present embodiment.

FIG. 1 is a diagram showing an exemplary configuration of a machining support system according to the present embodiment.

As shown in FIG. 1, a machining support system 10 includes a machine tool controller 2 for controlling a machine tool 3, and a machining support apparatus 1 for sending instructions to the machine tool controller 2 and setting an NC program, that is, a machining program, wherein the machine tool controller 2 and the machining support apparatus 1 are connected to each other via a network 6 such as a corporate LAN (Local Area Network). In addition, also connected to the network 6 is a CAD/CAM (Computer Aided Design and Computer Aided Manufacturing) system database 5, where data about tools, 3D CAD data or the like is stored.

The machining support apparatus 1 is connected with a measurement apparatus 4 that is a laser measurement device or the like for measuring a size of the tool and a distance between the tool and the workpiece, and inputs measurement results to the machining support apparatus 1.

Apparatus Configuration

<Machining Support Apparatus>

Figure 2:
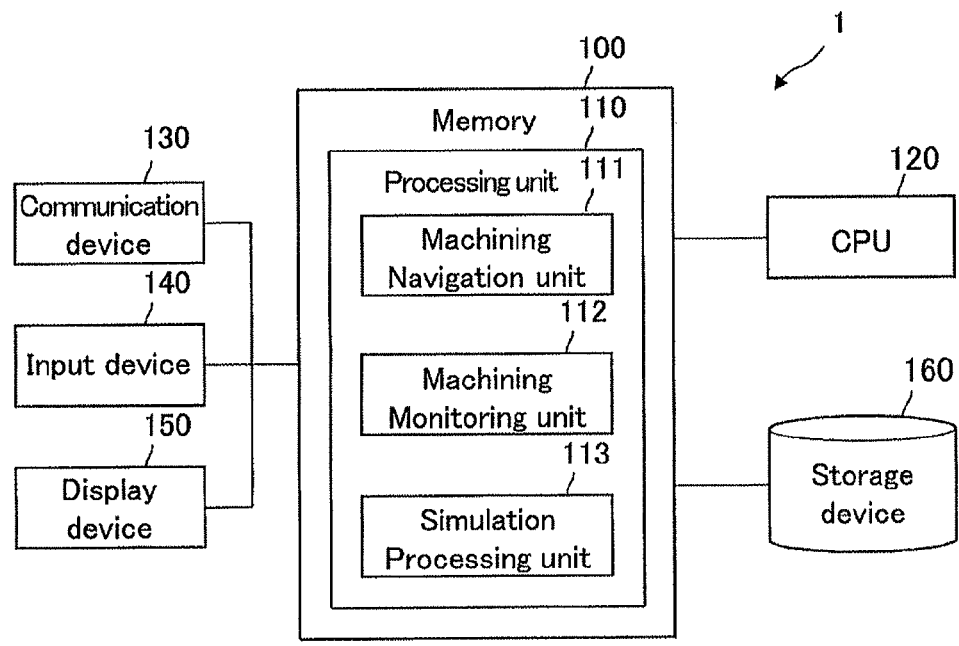
FIG. 2 is a diagram showing an exemplary hardware configuration of a machining support apparatus according to the present embodiment.

FIG. 2 is a diagram showing an exemplary hardware configuration of the machining support apparatus according to the present embodiment.

The machining support apparatus 1 is a PC (Personal Computer) or the like, and includes a memory 100, a CPU (Central Processing Unit) 120, a storage device 160 such as a hard disk, a communication device (communication unit) 130 that performs communication with externals, an input device (input unit) 140 such as a keyboard and a mouse, and a display device (display unit) 150 such as a display.

A program stored in the storage unit 160 is loaded into the memory 100, and executed by the CPU 120, thereby embodying a processing unit 110, a machining navigation unit 111, a machining monitoring unit 112, and a simulation processing unit 113.

As shown in FIG. 2, the processing unit 110 includes a machining navigation unit 111, a machining monitoring unit 112, and a simulation processing unit 113.

The machining navigation unit 111 sets up the machine tool controller 2, upon receiving machining preparation information and machining information via the input device 140, or installs an NC program in the machine tool controller 2.

The machining monitoring unit 112 receives the information about the status of the machine tool 3 from the machine tool controller 2, and monitors whether or not any interference occurs.

The simulation processing unit 113 stops the machine tool 3, upon detecting a simulation start code (to be described later) inserted in the NC program, and simulates the NC program from the simulation start code to a simulation end code (to be described later).

<Machine Tool Controller>

Figure 3:
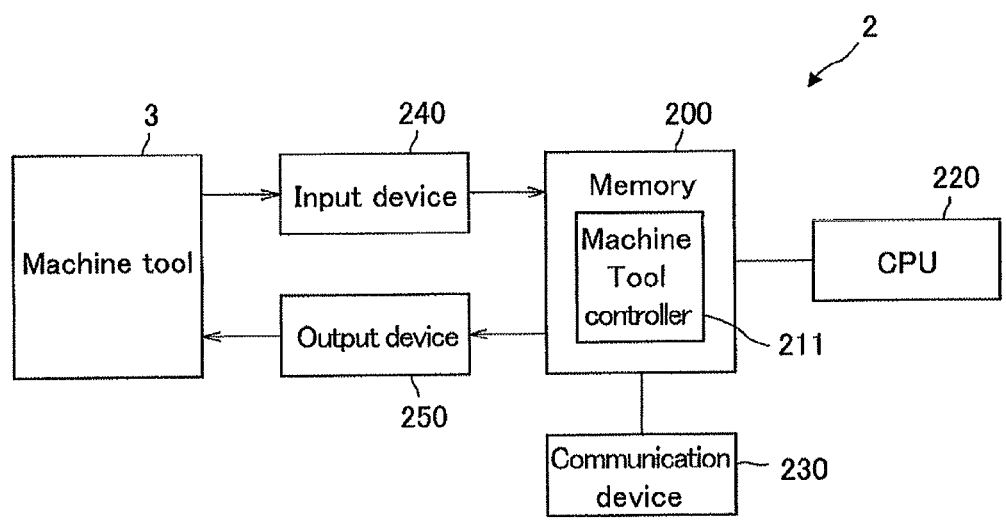
FIG. 3 is a diagram showing an exemplary hardware configuration of a machine tool controller according to the present embodiment.

FIG. 3 is a diagram showing an exemplary hardware configuration of the machine tool controller according to the present embodiment.

The machine tool controller 2 is generally a PLC (Programmable Logic Controller) or the like, but may be a normal PC or the like.

The machine tool controller 2 includes a memory 200, a CPU 220, a communication device 230 for transmitting and receiving data to and from the machining support apparatus 1 (FIG. 1) via the network 6 (FIG. 1), an input device 240 for receiving a signal from a sensor provided at the machine tool 3, and an output device 250 for outputting a control signal to the machine tool 3.

An NC program is loaded in the memory 200, and the machine tool controller 211 is embodied by the CPU 220 executing the NC program.

The machine tool controller 2 is preliminarily installed, as the NC program, with a ladder circuit and contact addresses thereof developed for the machine tool controller 2, the simulation start code, the simulation end code, and a user customized program and so forth. The simulation start code and the simulation end code will be described later.

In addition, the machine tool controller 2 is capable of instructing the machine tool 3 to set ON/OFF of a travel stop signal transmitted from the machining support apparatus 1, ON/OFF of an interlock circuit, ON/OFF of a warning, ON/OFF of a machining monitoring ready signal, and ON/OFF of a machining start permission signal.

<Appearance of Machining Support System>

Figure 4:
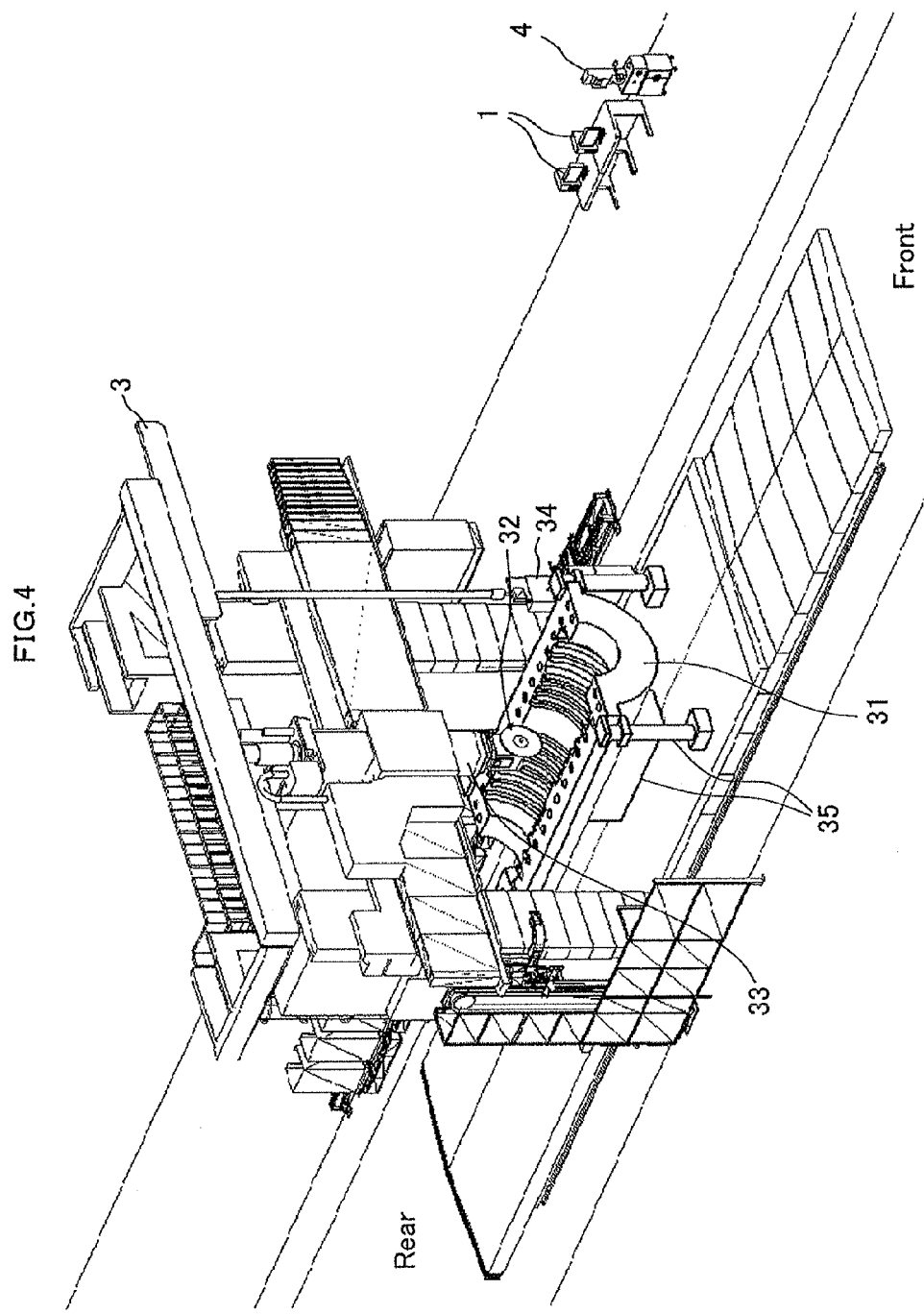
FIG. 4 is a first view showing the appearance of the machining support system according to the present embodiment.
Figure 5:
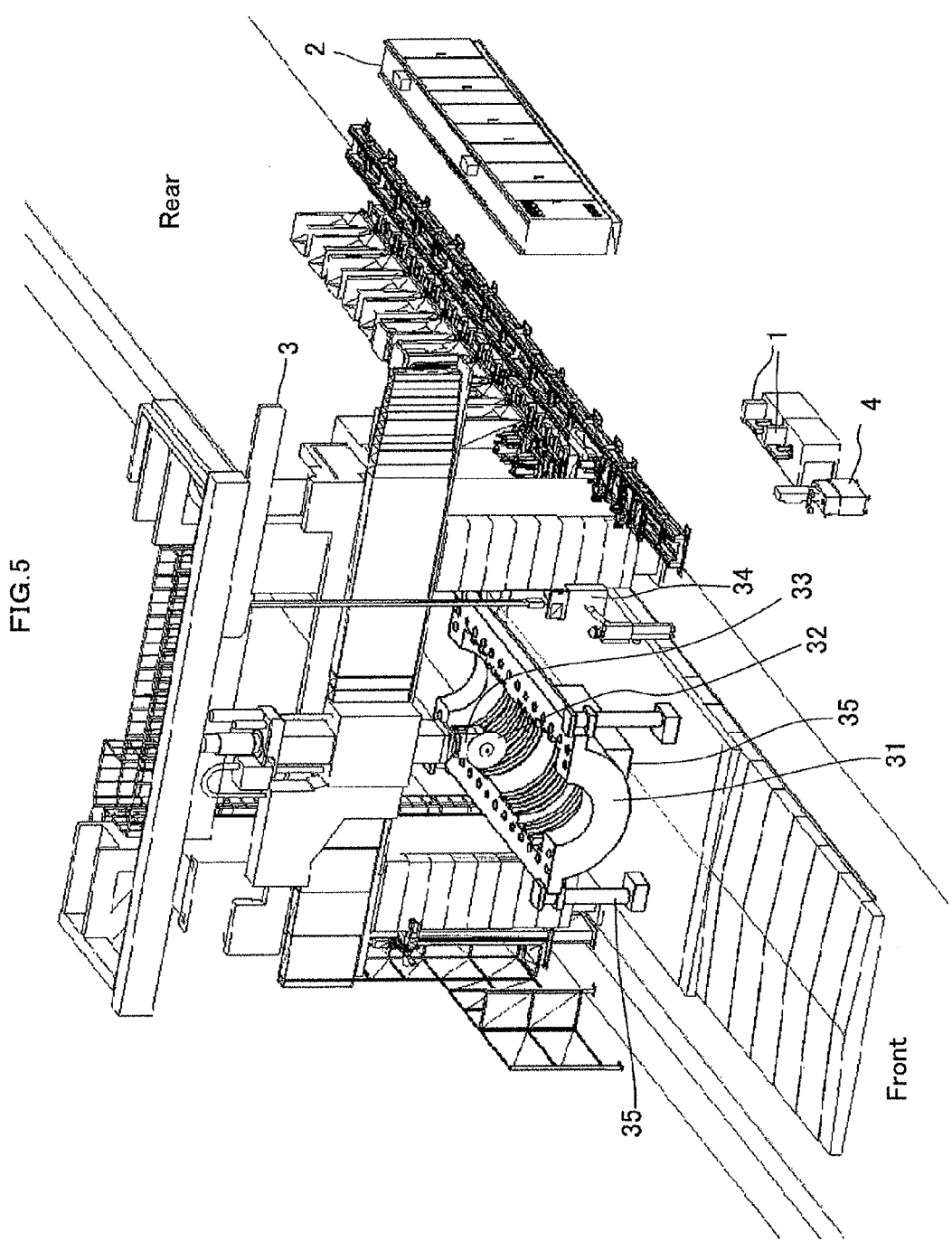
FIG. 5 is a second view showing the appearance of the machining support system according to the present invention.

FIGS. 4 and 5 are views showing the appearance of the machining support system according to the present embodiment. Here, by assuming that a front direction is where the tool is mounted, FIG. 4 is an external view from diagonally forward right, and FIG. 5 is an external view from diagonally forward left.

Note that, in FIGS. 4 and 5, the same components as those in FIG. 1 are denoted by the same reference numerals, and the description thereof will be omitted.

The machine tool 3 performs machining on a workpiece 31 using a tool 32.

It is common, as shown in FIG. 5, that the machine tool controller 2 is installed in the vicinity of the machine tool 3. Further, a PC as a machining support apparatus 1 and the measurement apparatus 4 is installed in the vicinity of the machine tool 3.

Note that the tool 32 is attached to the machine tool 3 via an attachment 33.

The machining support apparatus 1 and the machine tool controller 2 are connected to each other via the network 6, such as the LAN and the internet, as shown in FIG. 1.

In FIG. 4, the machining support apparatus 1 is placed in the vicinity of the machine tool 3 for the sake of convenience, but it is also possible to place the machining support apparatus 1 at a distance from the machine tool 3, for example, such as in another room different from that of the machine tool 3 and a manufacturing plant overseas.

Note that the operation of the machining support apparatus 1 may be performed through a monitor of a machine operation panel 34.

Procedure

Processing proceeds in the order of machining preparation and machining, and for machining preparation, there can be cases where the machining navigation unit 111 is utilized and where not utilized.

Hereinafter, procedures of the present embodiment will be described for a case where the machining navigation unit 111 is utilized, with reference to FIGS. 1-5 as appropriate. A case where the machining navigation unit 111 is not utilized will be described later.

An operation of the machining support apparatus 1 is possible in two ways, an operation via the machine control panel 34 of the machine tool 3, or an operation via the input device 140 of the machining support apparatus 1. Here, it is assumed that the machining support apparatus 1 is operated via the input device 140 installed in the machining support apparatus 1.

<Machining Support Apparatus>

Figure 6:
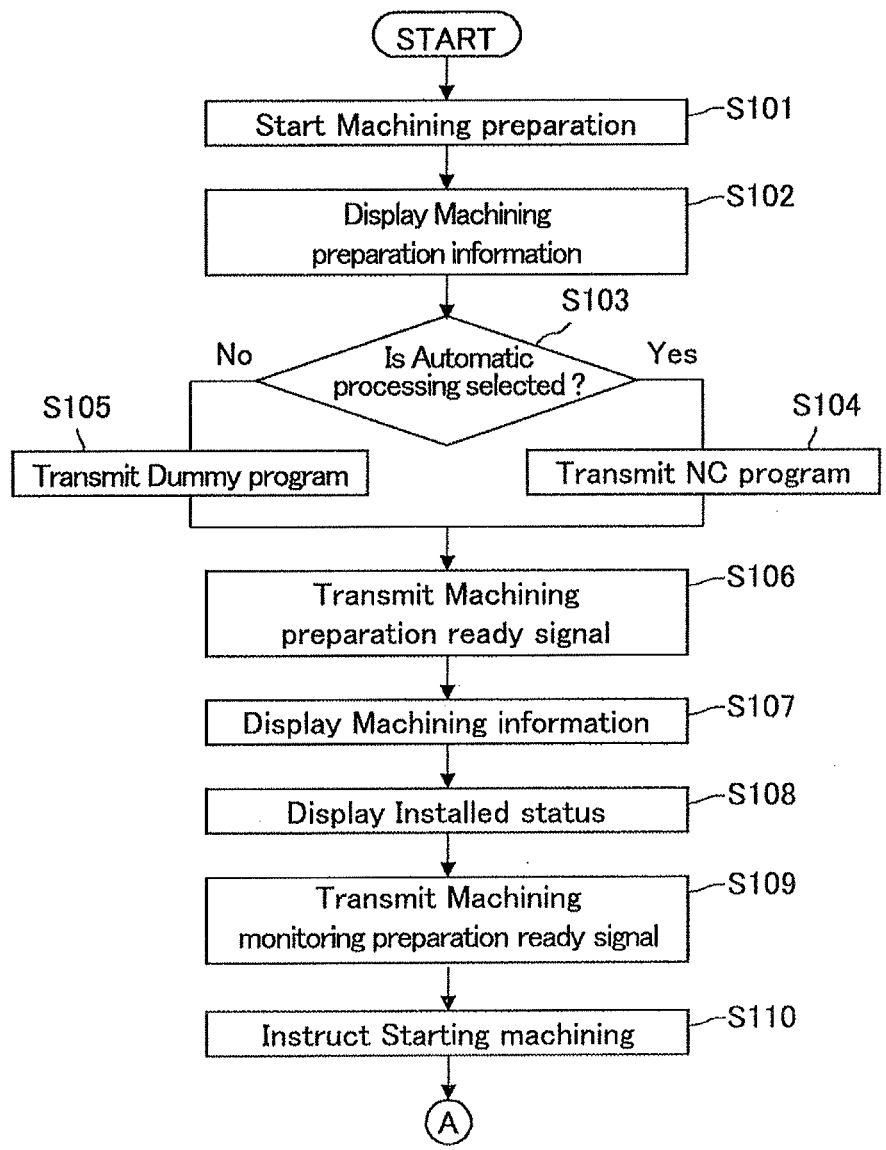
FIG. 6 is a first flowchart showing a procedure of the machining support apparatus according to the present embodiment.
Figure 7:
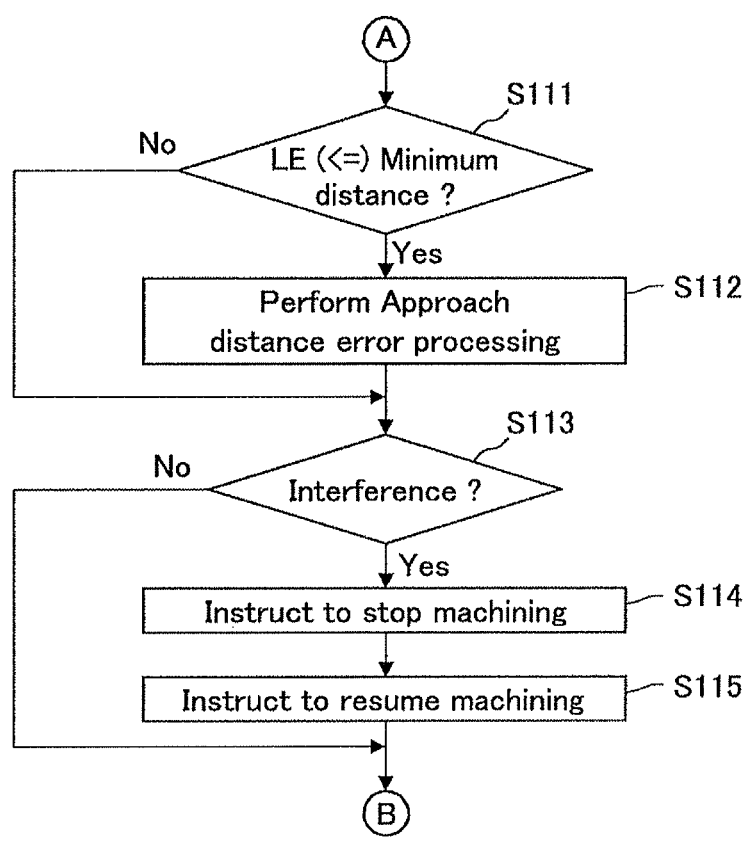
FIG. 7 is a second flowchart showing a procedure of the machining support apparatus according to the present embodiment.
Figure 8:
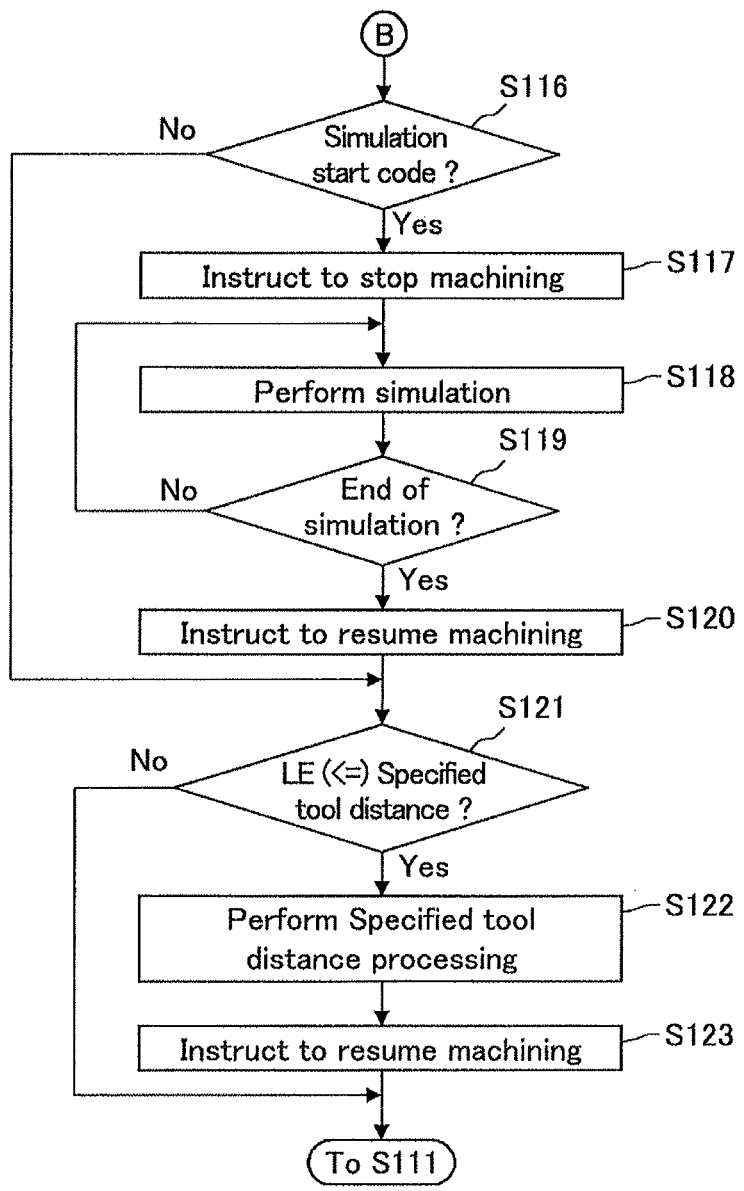
FIG. 8 is a third flowchart showing a procedure of the machining support apparatus according to the present embodiment.

FIGS. 6-8 are flowcharts showing a procedure of the machining support apparatus according to the present embodiment.

First, a machining preparation is started by the machining navigation unit 111 of the machining support apparatus 1 via the input device 140 (S101 in FIG. 6).

The machining navigation unit 111 displays a machining step name to be executed on the display device 150, based on the master information necessary for product manufacturing. At the same time, the machining step name may be displayed on the display device of the machine operation panel 34 of the machine tool 3. The master information is, for example, machining step information and the like which is stored in the storage device 160 of the machining support apparatus 1 or a machining step management system database (not shown).

It should be noted that this display may be substituted with a flashing of a machining step name, a voice output thereof via a speaker, or the like. Further, it is possible to instruct a user either with characters displayed on the display device 150, or with voices in a language which the user can understand.

Next, when a machining step name on display is selected via the input device 140, the machining navigation unit 111 displays machining preparation information necessary for the machining on the display device 150 (S102). The machining preparation information will be described later.

The user attaches required materials (a workpiece 31, a mounting jig 35, a tool 32, an attachment 34, and so forth) to the machine tool 3 according to the machining preparation information displayed on the display device 150. Here, the mounting jig 35 is configured to support the workpiece 31 when attaching (or mounting) the workpiece 31 to the machine tool 3.

Then, after installing the required materials to the machine tool 3, information of the required materials just installed is input to the machine tool controller 2 via the input device 140. Information on the required materials will be described later.

It should be noted that the information input on the required materials may be input via the machine control panel 34. Alternatively, through transmission to the machine tool controller 2 from the measurement apparatus 4 that measures a position of the workpiece 31 and the shape of the tool 32, information on the required materials may be input to the machine tool controller 2.

Next, the machining support apparatus 1 determines whether or not an automatic processing is selected as a processing method (S103). This is determined whether a button for automatic processing is selectively input or a button for manual processing is selectively input, which buttons are displayed on the display device 150.

As a result of step S103, when the automatic processing is selected (Yes at S103), the machining navigation unit 111 transmits an NC program to perform machining to the machine tool controller 2 (S104), and the machine tool controller 2 installs the transmitted NC program as the main program of the machine tool 3.

When the automatic processing is not selected (No at S103), that is, when the manual processing is instructed, a dummy program for signaling the machining to be started is transmitted to the machine tool controller 2 (S105), then the machine tool controller 2 installs the dummy program as the main program. Here, description will be given, assuming that the NC program is installed as the main program.

It should be noted that the machining navigation unit 111 may determine whether or not the information inputted to the machine tool controller 2 for starting machining is enough, for example, by making a comparison with the information inputted to the machine tool controller 2 via the machine tool 3 and the machining preparation information.

The machining navigation unit 111 constantly monitors the input information to the machine tool controller 2 after the processing is started, and when the enough information is inputted, the machining navigation unit 111 transmits a machining preparation ready signal to the machining monitoring unit 112 and the machine tool controller 2 (S106).

Upon receiving the machining preparation ready signal from the machining navigation unit 111, the machining monitoring unit 112 extracts configuration information (machining information) required for monitoring machining from the CAD/CAM system database 5, and displays the result as machining information (S107). Displaying the machining information will be described later. The user may adjust or set the machining information on display.

Then, the machining monitoring unit 112 retrieves information from the machine tool controller 2, and displays current (when installed) status (installed status) of the required materials on the display device 150 (S108). Displaying the installed status will be described later.

The machining monitoring unit 112 transmits a machining monitoring preparation ready signal to the machine tool controller 2 (S109).

Then, the machining monitoring unit 112 displays information indicating to be in a state of a machining start enabled on the display device 150, and goes into a machining monitoring started status.

Upon receiving the machining monitoring preparation ready signal from the machining monitoring unit 112 of the machining support apparatus 1, the machine tool controller 2 enters into a machining start enabled state. Accordingly, an interlock of the machine tool controller 2 is released.

After verifying the machining start enabled information displayed on the display device 150, the user instructs starting machining to the machine tool controller 2, by entering information to start a machine operation for the subject machining in the machining support apparatus 1 via the input device 140 (S110). The processing at step S110 is performed, for example, by the machine operation start button displayed on the display device 150 being selectively inputted via the input device 140.

At this time, if an automatic machining is specified, a cycle start button is activated, and if a manual machining is specified, performed by the user are a rotation of the tool 32, an angle change of the rotary table, coolant operation for cooling water, cooling oil, or cooling mist, and so forth.

Upon receiving information to start a machine operation, the machine tool controller 2 performs machining by controlling the machine tool 3.

In the machining monitoring started status, the machining monitoring unit 112 always receives coordinate values of the tool 32 (all coordinate values of linear axis systems and rotary shaft systems in production) in the machine tool 3 from the machine tool controller 2. Upon receiving the coordinate values of the tool 32, the machining monitoring unit 112 immediately moves operation nodes of the machine tool 3 to meet changed coordinates, thereby operating the three-dimensional model of the tool 32 on the display device 150. That is, based on the coordinate values of the tool 32 of the machine tool 3 obtained from the machine tool controller 2, the machining monitoring unit 112 operates the three-dimensional model of the machine tool 3 displayed on the display device 150.

While operating such three-dimensional model linked with the machine tool 3, the machining monitoring unit 112 continues to monitor the machine tool 3 until the end of the machining.

Further, the machining monitoring unit 112 calculates a distance between the machining area of the tool 32 (a dead band to be described later is set) and each of the required materials other than the tool 32, from the measuring by the measurement apparatus 4.

Then, the machining monitoring unit 112 determines whether or not the distance between the tool 32 and each of the required materials is less than or equal to a predetermined minimum distance (set distance) (S111 in FIG. 7).

As a result of step S111, if the distance between the tool 32 and each of the required materials is greater than the predetermined minimum distance (No at S111), the machining support apparatus 1 proceeds the processing to step S113.

The required materials are, as described above, the workpiece 31, the mounting jig 35, the tool 32, the attachment 34, and the like.

As a result of step S111, if the distance between the tool 32 and each of the required materials is less than or equal to the predetermined minimum distance (Yes at S111), the machining monitoring unit 112 determines as an approach distance error and performs an approach distance error processing (S112).

The approach distance error processing indicates the approach distance error to the user by changing color on the display device 150 of the required materials such as the tool 32 and the workpiece 31, or displaying a warning. Alternatively, the machining monitoring unit 112 may send a movement stop signal for the tool 32 to the machine tool controller 2, thereby stopping the machine tool 3. It is possible for the user to specify via the input device 140 of the machining support apparatus 1 about what process is performed when the approach distance error is determined.

Note that when the machining is normal, the tool 32 and the workpiece 31 are displayed, for example, in green.

Here, when the approach distance error processing at step S112 is to stop the machine tool 3, a machining resumption instruction is sent to the machine tool controller 2 via the input device 130. Upon receiving the machining resumption instruction, the machine tool controller 2 resumes the machining of the machine tool 3.

Based on coordinate values of the tool 32 transmitted from the machine tool controller 2 and so forth, the machining monitoring unit 112 is always determining whether or not interference has occurred (S113). Here, an occurrence of interference means that the machining monitoring unit 112 determines that a portion of the machining to be completed is already made on the workpiece 31. There are efforts to prevent interference in the processing at step S112, and steps S116-S119, S121, to be described later, but still the interference may occur at the stage of actual machining. Step S113 is a process to minimize the interference in case such a situation has occurred.

As such a reason that interference occurs at the stage of actual machining, there are possibilities, when the workpiece 31 is large, of positioning accuracy error of the machine tool 3, effects of thermal expansion of the machine tool 3 and/or the workpiece 31, or the like. Another possibility is an error that occurs when human interruption is made, in order to prevent the failure of the machined surface due to unpredictable phenomenon in general, such as wear of the tool 32 and vibration, in an automatic operation within a scope of the machining tolerance, where human interruption includes manual pulse handle operation, spindle rotation speed change, feeding speed change, or the like. For these reasons, there is a case where unpredictable phenomenon occurs in the processing at step S112, or steps S116-S119, S121, to be described later. As described above, the processing at step S113 is intended to minimize the interference to the actual machining in such a case.

As a result of step S113, if the interference has not occurred (No at S113), the machining support apparatus 1 and the machine tool controller 2 proceeds to step S116.

As a result of step S113, if the interference has occurred (Yes at S113), the machining monitoring unit 112 immediately instructs the machine tool controller 2 to stop machining (S114), and the machining is stopped.

It should be noted that, by using the attributes of the three-dimensional CAD data at the tool 32, the machining monitoring unit 112 regards a contact between a machining portion of the tool 32 (dead band to be described later is set) and the workpiece 31 as machining. Further, the machining monitoring unit 112 operates by removing a cubic content that encompasses the machining portion of the tool 32, and determines a contact with a three dimensional shape of the workpiece, for which the machining is to be completed, as a normal machining, while determines as a machining error (interference) when a three-dimensional shape of the workpiece, for which the machining is to be completed, is encompassed. If it is determined that the interference has occurred, the machining monitoring unit 112 detects the interference as an error, as described above, and immediately transmits a movement stop signal for the tool 32 to the machine tool controller 2.

However, when the three-dimensional shape of the workpiece, for which the machining is to be completed, is in contact with the tool 32, as some errors are included in the actual operation of the machine tool 3 even if the command values from the machine tool controller 2 are normal, there is a problem that it is determined to have interference at the portion where a contact is expected. In addition, as it is often difficult to create a shape by considering the tolerance value for a shape of the normal workpiece, for which the machining is to be completed, there is a problem that it is determined to have interference if machining is performed with a shift by the machining tolerance. For example, as a three-dimensional model of the tool 32 has a very small stepped shape rather than a full circle, a convex portion of the stepped shape encompasses a region, for which the machining is to be completed, even during the normal machining. Accordingly, there is a case that the machining monitoring unit 112 incorrectly determines even during the normal machining that the interference has occurred.

That is, as the three-dimensional model of the tool 32 has a stepped profile centering around the contour of the actual tool, a convex portion of the stepped profile is set outside the contour of the actual tool. Accordingly, even when the tool 32 is not in contact with the workpiece 31 actually, or the contour of the tool 32 is in contact with the workpiece 31, the machining monitoring unit 112 incorrectly determines that the tool 32 is cutting into the workpiece 31.

In this embodiment, in order to avoid the interference caused by movement errors and/or machining tolerances of the machine tool 3 (i.e., erroneous interference caused by the stepped shape of setting of the tool 32), there is a function to set the shape of the tool 32 slightly smaller than the actual size. The area that is made smaller is referred to as a dead band. It is possible to specify the dead band for each of parameters, such as the longitudinal and the width directions of the tool 32 that affect the dimensions of width and depth in the machining, or the diameter. The dead band may be changed in real shape relative to the actual shape of the tool 32 instantly, for each of the tools 32 and for each kind of machining if necessary, and may be changed during machining even further.

For example, it is desirable to match the convex portion of the stepped profile to the contour of the actual tool.

In addition, it is possible for the machining monitoring unit 112 to detect an error, by determining all as the machining error (interference) when a machining portion of the tool 32 contacts or encompasses the required materials other than the workpiece 31 (inclusive the mounting jig 35). Also in this case, the machining monitoring unit 112 immediately transmits a movement stop signal for the tool 32 to the machine tool controller 2.

Upon receiving the machining stop instruction transmitted at step S114, the machine tool controller 2 stops the machine tool 3 according to the movement stopping ladder circuit. Then, the user inspects the machine tool 3 that is stopped, and verifies the cause of the interference.

Upon completing the inspection, the machining resumption instruction is input to the machining support apparatus 1 via the input device 140. The machining support apparatus 1, to which the machining resumption instruction is input, instructs the machine tool controller 2 to resume the machining (S115), and in turn the machine tool controller 2 makes the machine tool 3 resume the machining.

The machining monitoring unit 112 determines whether or not the simulation start code inserted in the NC program is detected (S116 in FIG. 8).

As a result of step S116, if the simulation start code is not detected (No at S116), the machining monitoring unit 112 proceeds to step S121.

As a result of step S116, if the simulation start code is detected (Yes at S116), by transmitting a movement stop instruction to the machine tool controller 2, the machining monitoring unit 112 instructs the machine tool controller 2 to stop machining (S117). At this time, the machining monitoring unit 112 obtains coordinates, where the tool 32 is stopped, from the machine tool controller 2.

Then, the simulation processing unit 113 performs a simulation processing to simulate a portion enclosed with a simulation start code and a simulation end code (referred to as a simulated portion) in the NC program (S118).

Specifically, the simulation processing is performed in the following procedure.

(a1) First, the simulation processing unit 113 extracts programming contents enclosed with the "simulation start code" and the "simulation end code" (simulated portion) within the NC program from the machine tool controller 2.

(a2) Next, the simulation processing unit 113 decodes the extracted portion of the NC program using a NC program decoding function.

(a3) Then, the simulation processing unit 113 displays a simulated movement of the tool 32 according to the decoded portion of the NC program on the display device 150. At this time, the machine tool 3 remains stopped.

That is, in the simulation processing, the simulation processing unit 113 displays on the display device 150, in the state that the machine tool 3 is stopped, what the machine tool 3 simulates an operation of the simulated portion of the NC program. For this display, description will be given later.

As the simulation start code, it is desirable to use, for example, an unused code (e.g., "M100") in M codes used in the NC program. Similarly, as the simulation end code, it is desirable to use an unused code (e.g., "M101") in the M codes. In this case, the portion enclosed with "M100" and "M101" in the NC program becomes the simulated portion.

Thus, by using unused codes in the M codes, it is possible to perform a simulation processing according to the present embodiment, without changing the NC program or the system significantly.

Incidentally, it is obvious that the simulation start code and the simulation end code are not limited to the M codes.

At this time, for example, if an extracted NC program is a move command, the simulation processing unit 113 executes a move command only for a graphic on the display unit 150. That is, the machining support apparatus 1 performs a simulated operation (simulated processing) of the machine tool 3, by moving a graphic of the machine tool 3 on the display device 150, while the actual machine tool 3 is stopped. Operating speed of the graphic of the machine tool 3 is adjustable in the simulated operation, either for making it faster or slower.

Note that the simulation start code and the simulation end code can be inserted in the NC program any number of times.

The simulation processing unit 113 determines whether or not a simulation processing is ended (S119). An instruction of the simulation end is determined, for example, whether or not the simulation processing is executed normally until the simulation end code in the NC program. Alternatively, the simulation processing unit 113 may execute the simulated processing repeatedly, until information indicative of completing the simulation is input via the input device 140. In this case, a determination performed at step S119 is whether or not an end of the simulation has been input via the input device 140.

As a result of step S119, if the simulation has not ended (No at S119), the simulation processing unit 113 repeats the simulation processing.

As a result of step S119, if the simulation has ended (Yes at S119), the machining monitoring unit 112 instructs the machine tool controller 2 to resume machining, by transmitting a machining resumption instruction to the machine tool controller 2 (S120). Upon receiving the machining resumption instruction, the machine tool controller 2 makes the machine tool 3 resume machining.

Thus, by performing simulation processing of the simulated portion, it is possible to verify whether or not there is an error in the machining preparation information for the required materials attached to the machine tool 3 or in the NC program. For example, as the machining preparation information is input by the user via the input device 140, there may be an error in the input.

In addition, it is possible for the user, through the simulation processing, to partially simulate and verify in advance whether or not interference occurs. Note that it is preferable that the simulated portion is specified according to the replacement of the tool 32 or the like.

Further, based on the measurement result by the measuring apparatus 4, the machining monitoring unit 112 is always calculating the shortest distance between the tool 32 and the workpiece 31.

The machining monitoring unit 112 determines whether or not a distance between the tool 32 and the workpiece 31 is less than or equal to a predetermined specified tool distance (set distance) (S121).

As a result of step S121, if the aforesaid distance is not less than or equal to the specified tool distance (No at S121), the machining monitoring unit 112 returns the processing to step S111, and repeats the processing at steps S111-S123 until the end of machining is instructed.

As a result of step S121, if the aforesaid distance is less than or equal to the specified tool distance (Yes at S121), the machining monitoring unit 112 performs a specified tool distance processing (S122).

The specified tool distance processing is, for example, to stop the machine tool 3 or to notify the user.

For example, by specifying 100 mm, for instance, as the specified tool distance, the machine tool 3 is stopped when the distance between the tool 32 and the workpiece 31 becomes 100 mm.

Specification of the specified tool distance is useful, for example, when a machining start coordinate is distant from the workpiece 31 and the first positioning cannot be measured. For example, by stopping the machine tool every time (it is possible to skip at the second time and beyond) at a fixed position just before machining, the user may then measure the distance between the tool 32 and the workpiece 31, using a scale or the like. This allows the user to verify whether or not the distance between the tool 32 and the workpiece 31 is significantly different from an expected distance for stopping, thereby preventing an operation error from occurring.

In other words, this allows the user to verify a case just before the machining such that, even if an input to the machine tool controller 2 has been made as planned, a material attached to the machine tool 3 has been incorrect.

In addition, when the tool 32 is moved manually with a high speed in any direction in the large machine tool 3, a braking distance from a stop command position becomes large. Therefore, as it possible to instantly command the machine tool, by specifying a distance assuring an absolute stop as the specified tool distance, either to stop immediately or slow down when the tool 32 has come to a position beyond the specified tool distance, there is also an effect of preventing a collision of the tool 32.

Alternatively, by making it possible to change the specified tool distance at any time, it is also possible to continuously specify prohibited distances according to the speed of the tool 32. This allows effective collision prevention.

Furthermore, the specified tool distance may be specified for each machining portion of the workpiece 31.

Then, resuming machining is instructed via the input device 140 (S123), and the machine tool controller 2 resumes machining. Thereafter, the processing unit 110 returns the processing to step S111, and repeats the processing at steps S111-S123 until the end of machining is instructed.

It is possible for the machining monitoring unit 112 to start a preparation for monitoring, even when not using the machining navigation unit 111, by selecting, via the input device 140, a dummy program for notifying the machining to start or a NC program for machining (by referencing conventional work instruction documents for the correct one). Then, upon completion of the preparation for monitoring, by releasing an interlock of the machine tool 3 via the input device 140 or the like, it becomes possible to start machining. That is, it is also possible to start machining with a manual operation via the input unit 140.

It should be noted that the processing at steps S111, S113, S116, and S121 need not be performed in this order, and may be performed in any order, or in parallel.

<Machine Tool Controller>

Figure 9:
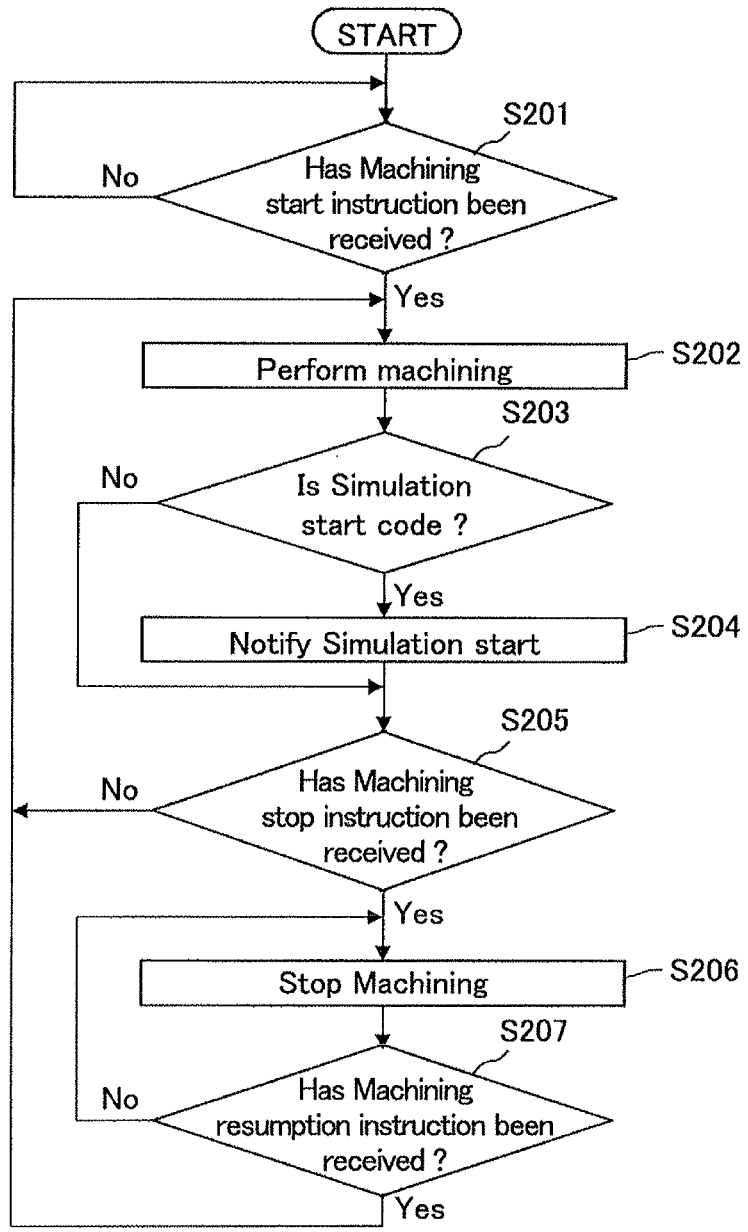
FIG. 9 is a flowchart showing a procedure of the machine tool controller according to the present embodiment.

FIG. 9 is a flowchart showing a procedure of the machine tool controller according to the present embodiment.

Note that it is assumed that the processing in FIG. 9 is in a state in which setting of the NC program is completed.

First, the machine tool controller 2 determines whether or not a machining start instruction has been received from the machining support apparatus 1 (S201).

As a result of step S201, if a machining start instruction has not been received (No at S201), the machine tool controller 211 returns the processing to step S201, and waits for a machining start instruction.

As a result of step S201, if a machining start instruction has been received (Yes at S201), the machine tool controller 211 controls the machine tool 3 according to the NC program, and performs machining (S202).

Then, the machine tool controller 211 determines whether or not a code to be executed in the NC program is a simulation start code (S203).

As a result of step S203, if the code is not a simulation start code (No at S203), the machine tool controller 211 proceeds to step S205.

As a result of step S203, if the code is a simulation start code (Yes at S203), the machine tool controller 211 notifies the machining support apparatus 1 of a simulation start (S204). Being notified of the simulation start, the machining support apparatus 1 performs a simulation processing (Yes at S116, S117, and S118 in FIG. 8).

Then, the machine tool controller 211 determines whether or not a machining stop instruction has been received from the machining support apparatus 1 (S205). This machining stop instruction is the one which the machining support apparatus 1 has transmitted at step S114 in FIG. 7, step S117 in FIG. 8 or the like.

As a result of step S205, if the machining stop instruction has not been received from the machining support apparatus 1 (No at S205), the machine tool controller 211 returns the processing to step S202, and repeats the processing at steps S202-S207, until the machining stop instruction is received from the machining support apparatus 1.

As a result of step S205, if the machining stop instruction has been received from the machining support apparatus 1 (Yes at S205), the machine tool controller 211 stops machining of the machine tool 3 (S206).

Then, the machine tool controller 211 determines whether or not a machining resumption instruction has been received from the machining support apparatus 1 (S207). The machining resumption instruction is the one which the machining support apparatus 1 has transmitted at step S115 in FIG. 7, step S120 in FIG. 8, or the like.

As a result of step S207, if the machining resumption instruction has not been received from the machining support apparatus 1 (No at S207), the machine tool controller 211 returns the processing to step S206.

As a result of step S207, if the machining resumption instruction has been received from the machining support apparatus 1 (Yes at S207), the machine tool controller 211 returns the processing to step S202, and repeats steps S202-S207 until the machining stop instruction is received from the machining support apparatus 1.

Exemplary Screens

<Machining Preparation Information Input Screen>

FIG. 10 is an example of an input screen for machining preparation information, according to the present embodiment.

A machining preparation information input screen 300 is a screen displayed on the display device 150 at step S102 in FIG. 6.

As shown in FIG. 10, the machining preparation information input screen 300 displays a step name, a workpiece name, a method of mounting the workpiece 31, a machining portion, a tool name, and the like. Besides, information about accessories such as a holder name of the tool 32, a machining cutting tool, and a tool 32, processing conditions, information related to an attachment, or the like may be displayed.

In addition, a machining procedure template 310 is displayed on the machining preparation information input screen 300.

Those displayed as the machining procedure template 310 are, as shown in FIG. 10, a name of the mounting jig 35 (jig name) for fixing the workpiece 31, a placing position of the workpiece 31, a mounting direction of the tool 32, and a mounting position of the tool 32. In addition to the above information, those displayed as the machining procedure template 310 may be a type of the attachment, a type of the tool 32, reference dimension when mounting the tool, a rotational speed of the tool 32, a moving speed of the tool 32, or the like. Further, those displayed as the machining procedure template 310 may be, a portion to be measured after completion of the machining in order to verify whether the workpiece 31 is machined as intended, the measurement apparatus 4 used for the measurement. Furthermore, those displayed as the machining procedure template 310 may be machining dimensions to be targeted for the measurement, information about the workpiece 31, the mounting jig 35, the tool 32, a measurement device, the attachment, or the like. Moreover, those displayed as the machining procedure template 310 may be a storage location of each of the required materials for machining, an operation sequence (operation procedure of an interlock circuit) of mounting required materials and operating machining, or the like.

The machining preparation information input screen 300 is displayed for each of the predetermined steps (e.g., attaching a tool, verifying a tool, or the like), prompting the user to verify each step.

For each information item displayed on the machining preparation information input screen 300, a check window 320 is displayed.

While verifying the steps on the machining preparation information display screen, the user performs mounting the required tool 32 and the like. And, upon completion of each of steps on the machining preparation information input screen 300, the user selects the corresponding check window 320 for input. Then, a check mark appears in the check window 320.

It may be designed such that the user cannot proceed to the steps ahead, without inputting checks in all of the check windows 320. Note that any given checking windows 320 may be disabled.

By doing so, it is possible to prevent a procedural error. Further, the check window 320 may be omitted.

It should be noted that the machining preparation information input screen 300 may be displayed on the machine operation panel 34 (FIG. 4, FIG. 5) of the machine tool 3. Then, while attaching the required materials, the user may input a check in the check window 320 via a touch panel of the machine operation panel 34, or the like. By doing so, as the machining preparation information input screen 300 is displayed near the work area, it becomes easier to verify steps, to input the check windows 320, or the like. In this case, it may be designed such that, upon completion of input in all of the check windows 320 of the machining preparation information input screen 300, that information is sent to the machining support apparatus 1 and the machine controller 2, and the processing is allowed to proceed to the next operation.

Here, the machining preparation information input screen 300 may be displayed on the machine operation panel 34 only when performing operations for the machine tool 3. In this case, when working at the machining support apparatus 1 or the machine tool controller 2, the machining preparation information input screen 300 may be displayed on the display unit 150 of the machining support apparatus 1, or a display device (not shown) of the machine tool controller 2.

Note that in the present embodiment, upon completion of the input to all of the check windows 320, the processing is allowed to proceed to the next operation, but it is not limited thereto, and the processing may proceed to the next operation, by an "end button" (not shown) being selected.

<Required Material Information Input Screen>

FIG. 11 is an example of a required material information input screen according to the present embodiment.

The required material information input screen 400 is a screen displayed on the display device 150 after step S102 in FIG. 6.

As shown in FIG. 11, those displayed on the required material information input screen 400 are input windows for inputting information such as the origin of the workpiece 31 (workpiece origin), the difference value between the origin of the machine tool 3 and the origin of the workpiece 31 (origin difference value).

Those displayed on the required material information input screen 400, besides above, may be input windows for inputting coordinate values of the machine tool 3 corresponding to the origin of the workpiece 31, a difference value between the origin of the machine tool 3 and the origin of the tool 32, and coordinate values of the tool 32 corresponding to the origin of the workpiece 31. In addition, those displayed on the required material information input screen 400 may be input windows for inputting auxiliary information, which is used for inputting information about the required materials, such as respective difference values between the shape and coordinate values of the tool 32 planned to be used, and the shape and coordinate values of the tool 32 actually attached. Further, those displayed on the required material information input screen 400, as the auxiliary information for inputting information about the required materials, may be respective difference values between the shape and coordinate values of the measuring apparatus 4 planned to be used, and the shape and coordinate values of the measuring apparatus 4 actually installed. Then, those displayed on the required material information input screen 400 may be input windows for inputting auxiliary information, which is used for inputting information about the required materials, such as reference origin at the time of measuring the size of the workpiece 31, a difference value between the origin of the workpiece 31 and the origin of the machine tool 3, and coordinate values of the machine tool 3, which corresponds to the reference origin at the time of measuring the size of the workpiece 31.

<Machining Information Input Screen>

Figure 12:
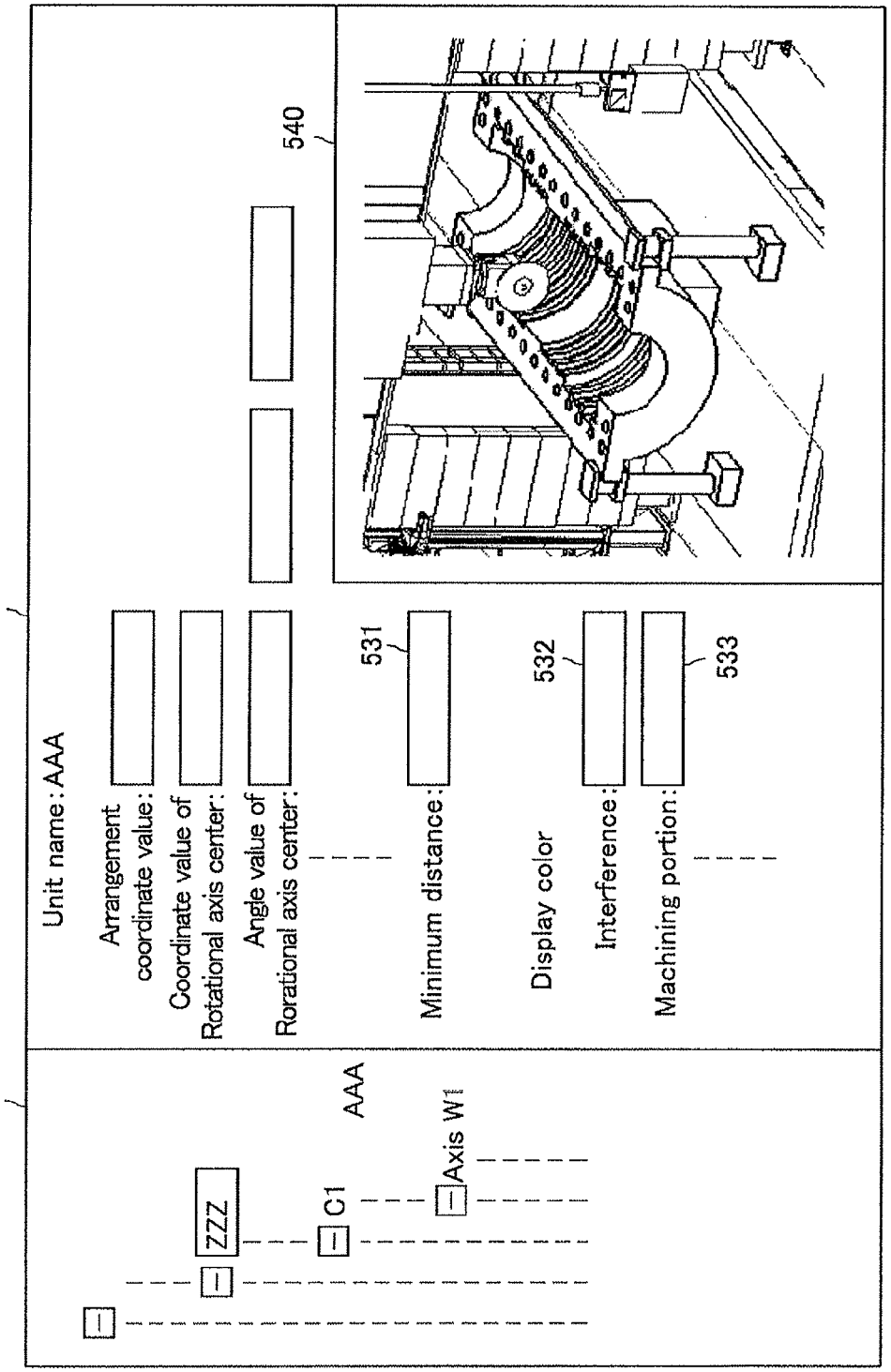
FIG. 12 is a diagram showing an example of an input screen for machining information according to the present embodiment.

FIG. 12 is a diagram showing an example of a machining information input screen according to the present embodiment.

Here, the machining information input screen 500 in FIG. 12 is a screen displayed when specifying machining information at step S107 in FIG. 6.

The machining information input screen 500 is composed of a tree structure display screen 510, and an information input screen 520.

The tree structure display screen 510 displays a hierarchical structure of the components of the required materials in a tree format having each component as a node. Note that this hierarchical structure is information stored in the CAD/CAM system database 5.

In the nodes (corresponding to the required materials) displayed on the tree structure display screen 510, there are components that operate in conjunction with coordinate values of the machine tool 3 during machining, and components that do not operate in conjunction therewith. In each of the nodes of element operating in association with coordinate values of the machine tool 3 during machining, there exist an axis name XYZ of the Cartesian coordinate system in the three-dimensional space, an auxiliary axis name UVW, a rotation axis name ABC, and the like. In addition, when an operating system is increased, each node name (element name) is associated with a number as an index.

For example, an X-axis of the first system of the first tool 32 is made as the $X_1$ axis, and the system is displayed as being operable independently.

Further, the joint portion of a node may be layered as a lower node in the original joint. For example, when the Y axis operates with the operation of the X-axis, nodes having the Y-axis operation can be expressed hierarchically as children of nodes having the X-axis operation.

The information input screen 520 includes a three-dimensional CAD data display screen 540. The three-dimensional CAD data display screen 540 is a mounting status of the required material displayed at step S108 in FIG. 6. Those displayed on the three-dimensional CAD data display screen 540 are three-dimensional CAD data such as the machine tools 3, the tool 32, and the workpiece 31. In addition, those displayed as the three-dimensional CAD data of the workpiece 31 may be a three-dimensional CAD data of a material state, a three-dimensional CAD data before starting machining (current), and a three-dimensional CAD data after the completion of machining (to be completed).

Further, on the information input screen 520, information about a node (unit: corresponding to a required material) selected in the tree structure display screen 510 ("AAA" in the example in FIG. 12) is displayed for setting. Note that, according to the present embodiment, the information about the node selected in the tree structure display screen 510 is displayed on the information input screen 520, but a node name may be selected from a node selection pull-down menu (not shown) on the information input screen 520, or the like. In this case, the information about the node selected at the node selection pull-down menu is to be displayed on the information input screen 520.

As shown in FIG. 12, as well as a selected unit name, a virtual (on the three-dimensional CAD data display screen) arrangement coordinate value of the selected unit is displayed on the information input screen 520. Besides this, those displayed on the information input screen 520 are a coordinate value of the center of the rotational axis of the tool 32 (coordinate value of the rotational axis center), an angle value of the center of the rotational axis indicating the arrangement direction of each of the tools 32 (the rotational axis angle), and the like. The above information can be fine-tuned through the input window.

In addition, it is possible in the information input screen 520 to input the minimum distance that indicates how close the tool 32 is to the workpiece 31 (reference numeral 531). This information is the one that is used at step S107 in FIG. 8.

Further, it is possible in the information input screen 520 to input information about display colors. Display colors can be specified for a portion where the tool 32 undergoes interference as shown in FIG. 12 (reference numeral 532), and a portion where the workpiece 31 undergoes machining (reference numeral 533). Besides this, display colors can be also specified for a material shape, current shape, and projected shape of the workpiece 31, the tool 32 when the distance between the tool 32 and the workpiece 31 becomes less than or equal to the minimum distance, or the like.

Note that, in the three-dimensional CAD data display screen 540, units corresponding to a selected unit in the tree structure display screen 510, a displayed unit in the information input screen 520, or the like may be highlighted by flashing or the like.

<Machining Information Display Screen>

Figure 13:
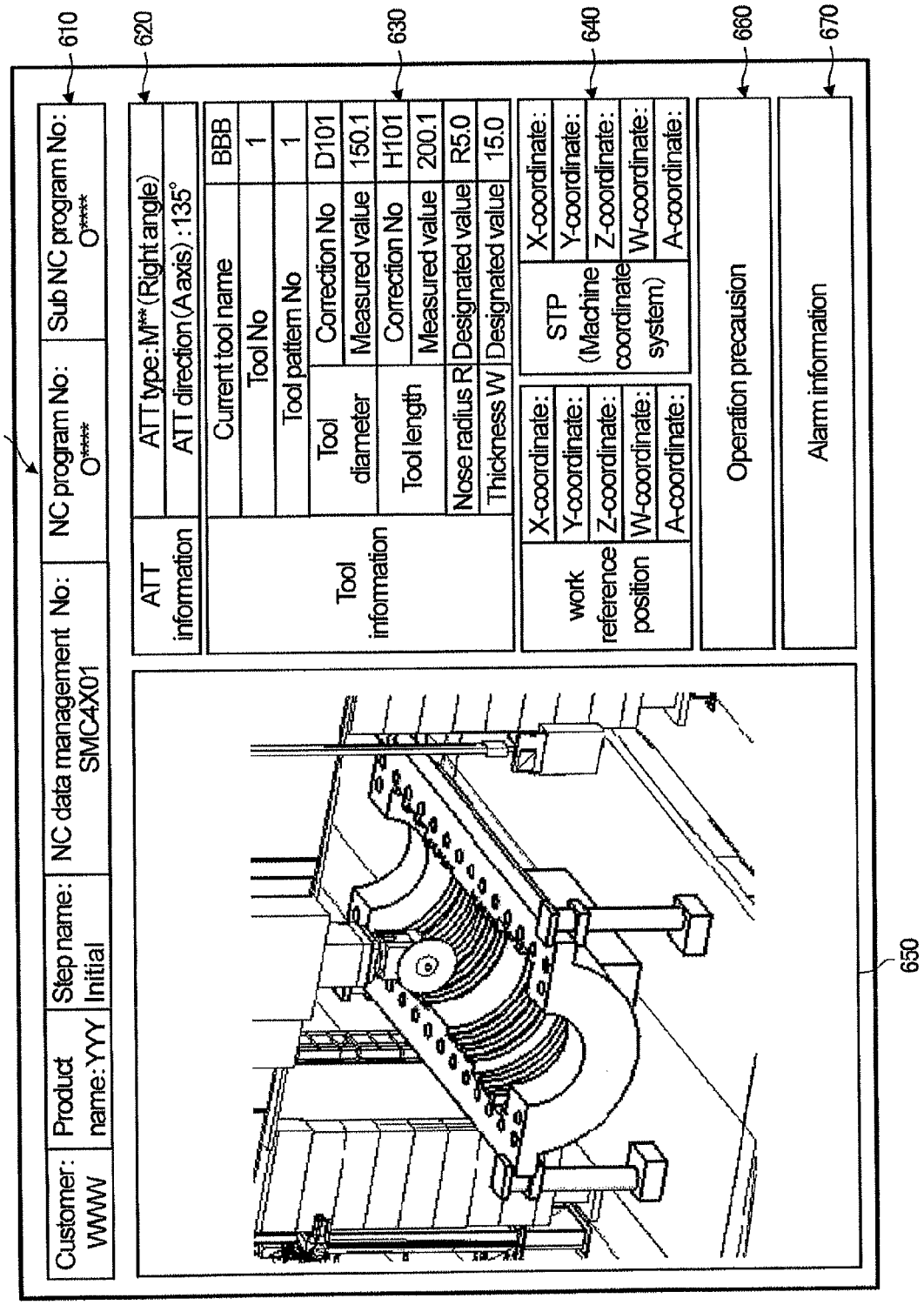
FIG. 13 is a diagram showing an example of a display screen for machining status according to the present embodiment.

FIG. 13 is a diagram showing an example of the machining status display screen according to the present embodiment.

A machining status display screen 600 is information that is displayed on the display device 150 when the actual machining is performed, during step S110 in FIG. 6 through step S123 in FIG. 8.

Those displayed on the machining status display screen 600 are machining step information (reference numeral 610), attachment information (ATT information: reference numeral 620), tool information (reference numeral 630), work reference position information (reference numeral 640), and so on.

In addition, the machining status display screen 600 has an operation screen 650. Based on the operating state of the machine tool 3 obtained from the machine tool controller 2, an operation in conjunction with the actual machine tool 3 is performed in the operation screen 650 using three-dimensional CAD data. That is, the movement of the machine tool 3 in conjunction with the actual machine tool 3 is displayed in the operation screen 650.

And when a simulation process is performed by the simulation processing unit 113 (S118 in FIG. 8), a simulated operation of the machine tool 3 is performed by the simulation processing unit 113 in the operation screen 650. At this time, the actual machine tool 3 is stopped as described above.

In the operation screen 650, a portion where interference occurs is displayed in a color that was input in the input window 532 for the display color of the interference in FIG. 12 (not shown).

It should be noted that information about operation precautions included in step information or the like is displayed in an operation precaution display screen 660.

Then, alarm information such as "Interference has occurred" is displayed in the alarm display screen 670 when such interference occurs. Note that those displayed in the alarm display screen 670 may be errors of the NC program, non-conformity of inputted information in FIG. 12, or the like.

<Tool Registration Screen>

FIGS. 14-17 are diagrams showing examples of tool registration screens according to the present embodiment.

The tool registration screen 700 is a screen that is displayed before the processing in FIGS. 6-8 is performed.

Figure 14:
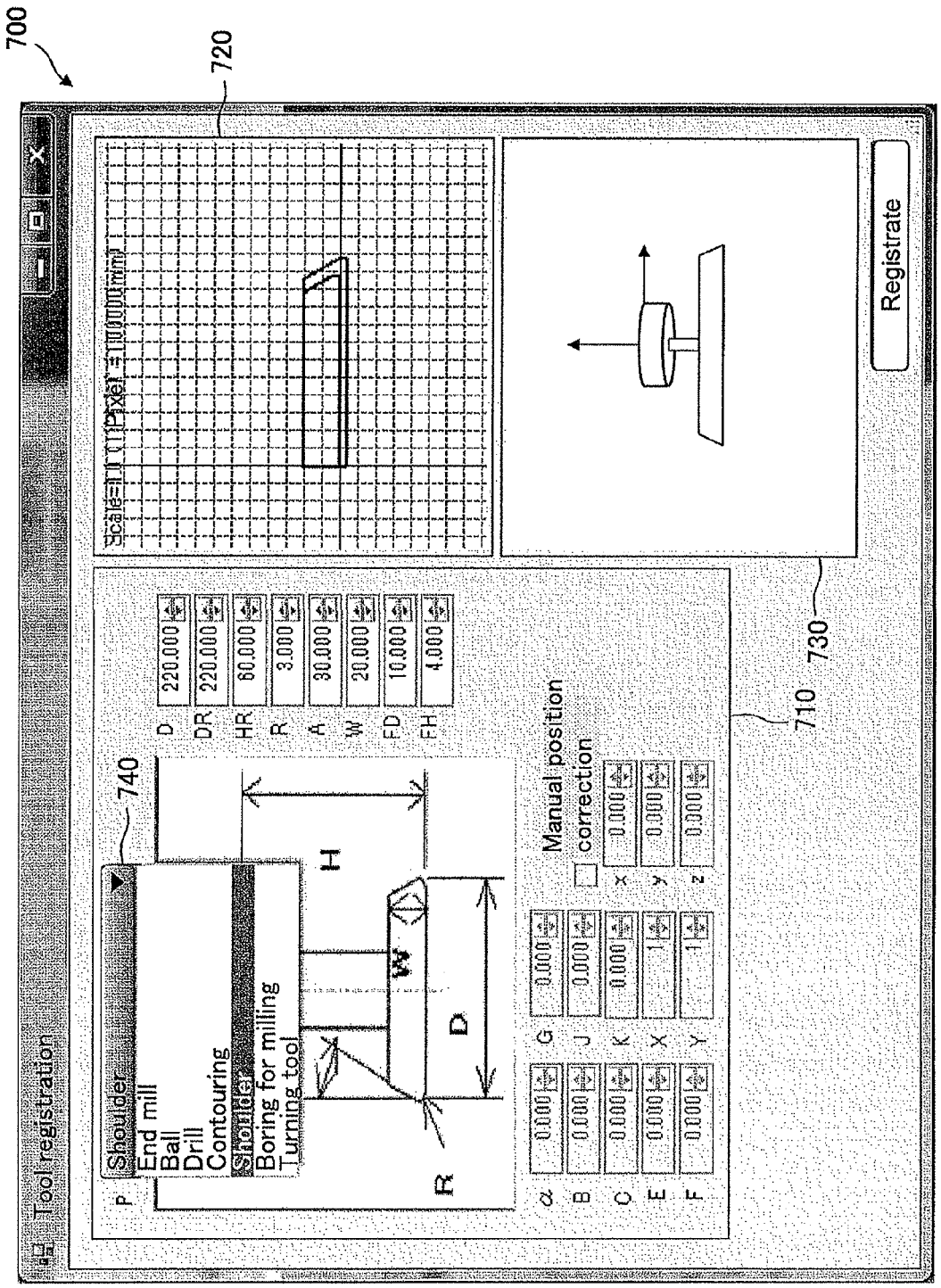
FIG. 14 is a first diagram showing an example of a tool registration screen according to the present embodiment.

As shown in FIG. 14, the tool registration screen 700 includes a size setting area 710, a set size display area 720, a three-dimensional tool CAD data display area 730, and a tool selection pull-down menu 740. The size setting area 710, the set size display area 720, and the three-dimensional tool CAD data display area 730 will be described later with reference to FIG. 15.

As shown in FIG. 14, it is possible to select the tool 32 to be displayed and registered in the tool selection pull-down menu 740. As shown in FIG. 14, the tool registration screen 700 will be described with reference to FIG. 15 when the "shoulder (mill)" is selected as the tool 32.

In the size setting area 710, it is possible to set respective parameters individually for the tool 32.

A cross-sectional view of the tool 32 on one side from the central axis thereof is displayed in the set size display area 720. Here, a contour 722 is a contour line based on the dimensions of the tool 32 that is stored in the CAD/CAM system database 5, and a contour 721 is a contour line based on the dimensions specified in the size setting area 710.

An area between the contour line 721 and the contour line 722 becomes an aforesaid dead band.

Three-dimensional CAD data of the tool 32, which is changed to the dimensions specified in the size setting area 710, is displayed on the three-dimensional tool CAD data display area 730.

Note that the manual position correction in the size setting area 710 is intended to be used when correcting the initial position of the tool 32.

When the registration button is selectively inputted, the tool 32 is registered in the CAD/CAM system database 5 with dimensions specified in the size setting area 710 (i.e., a state in which the dead band is set).

Figure 15:
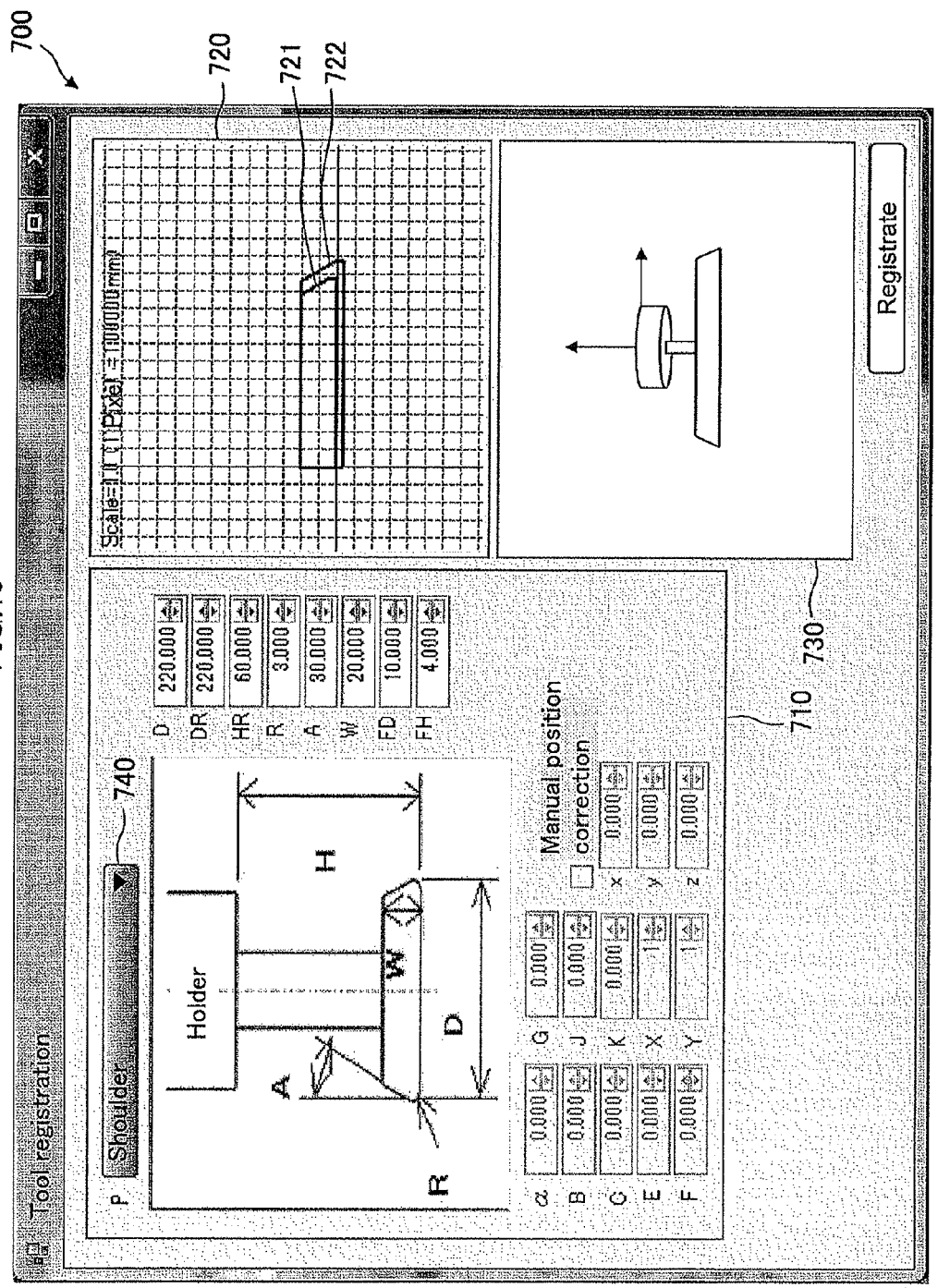
FIG. 15 is a second diagram showing an example of a tool registration screen according to the present embodiment.
Figure 16:
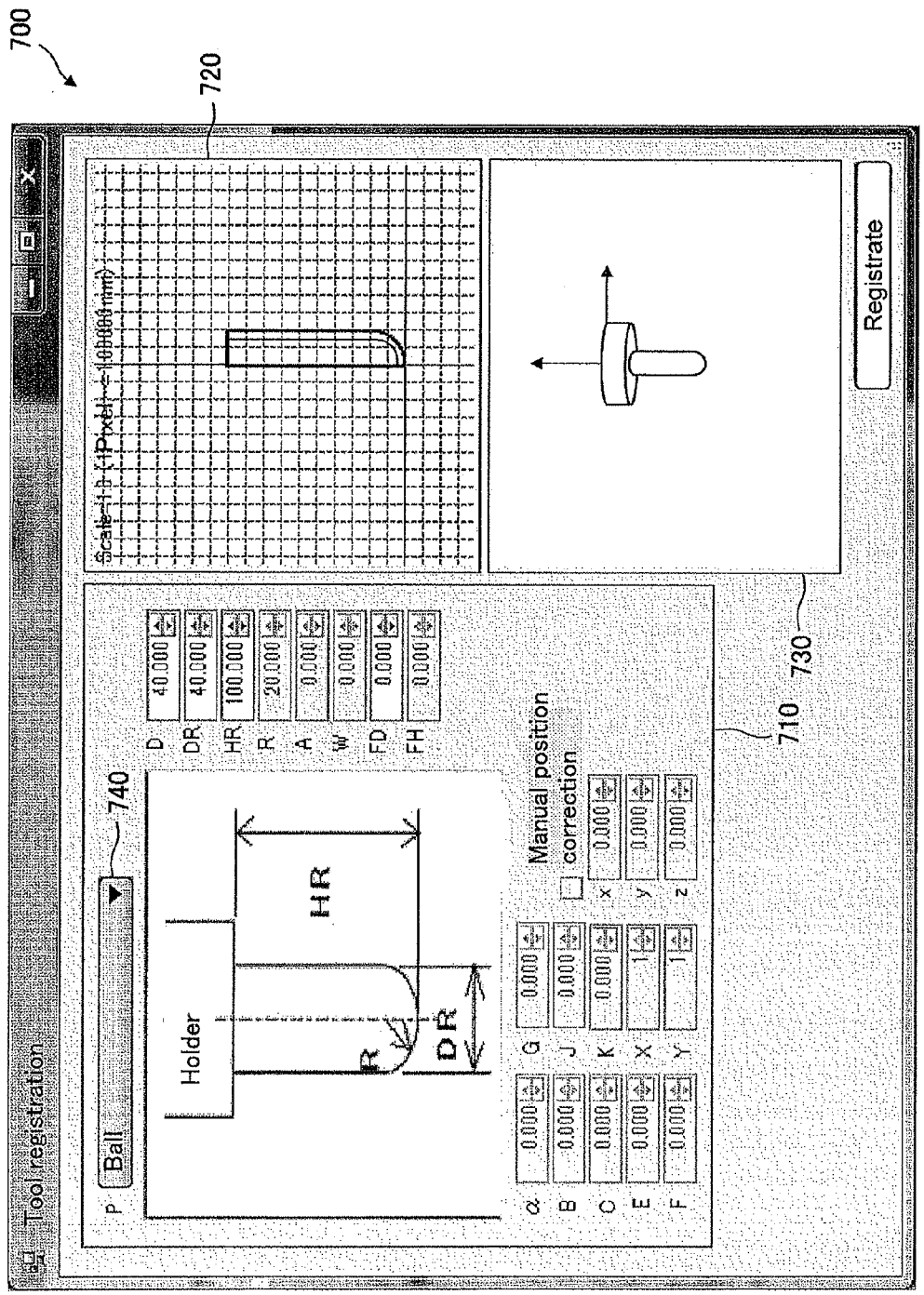
FIG. 16 is a third diagram showing an example of a tool registration screen according to the present embodiment.

FIG. 16 is the tool registration screen 700 in a case where a ball (end mill) is selected as the tool 32. As the tool registration screen 700 associated with FIG. 16 is similar to that of FIG. 15, the description thereof will be omitted.

Figure 17:
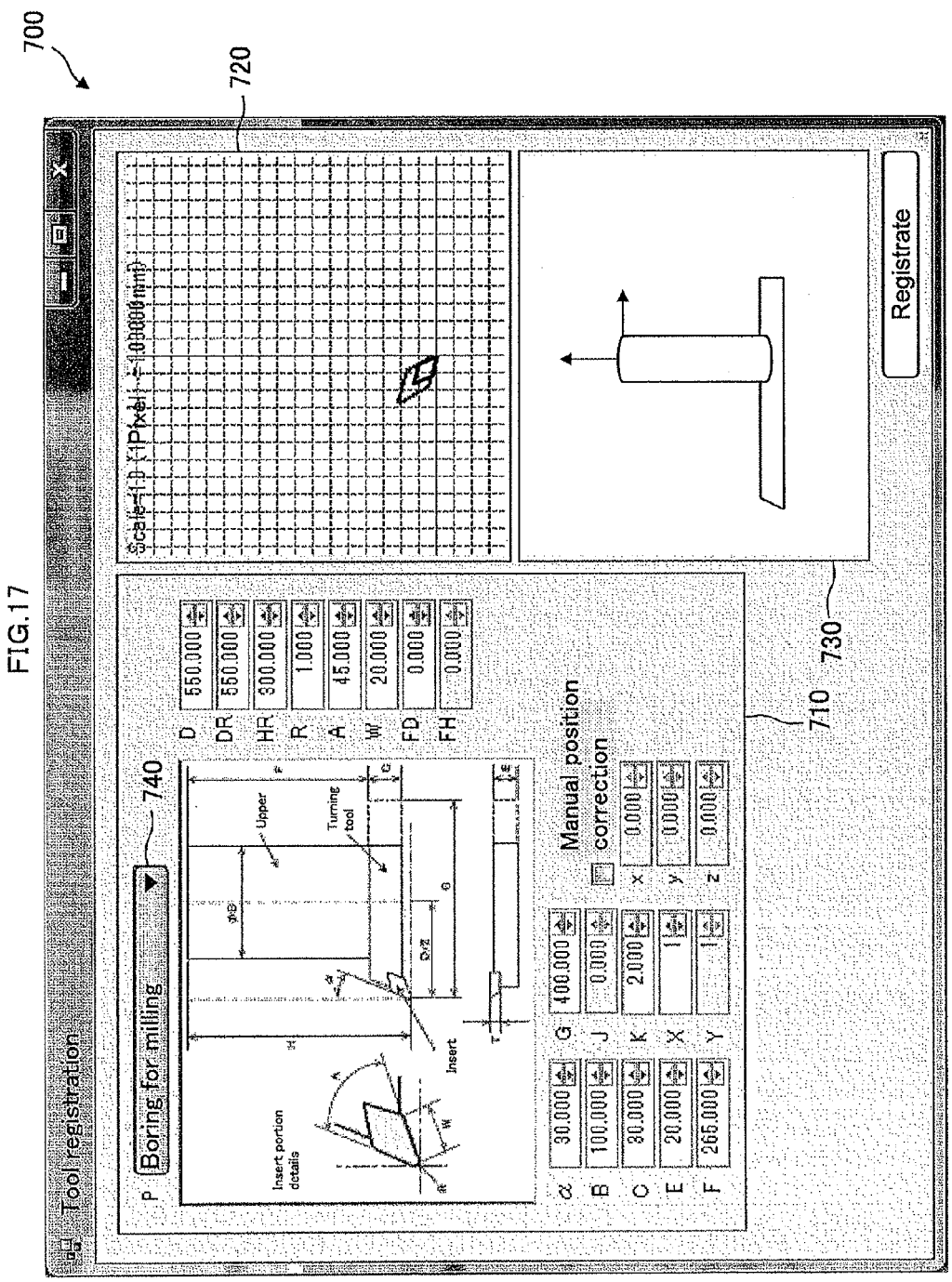
FIG. 17 is a fourth diagram showing an example of a tool registration screen according to the present embodiment.

In addition, FIG. 17 is the tool registration screen 700 in a case where a milling boring (mill) is selected as the tool 32.

The tool registration screen 700 associated with FIG. 17 is similar to that of FIG. 15, but only the machining portion is displayed on the specified size display area 720.

Process Summary

According to the present embodiment, if a simulation start code is detected in the execution portion of the NC program, a simulated portion of the NC program (from a simulation start code up to a simulation end code) is simulated by stopping the machine tool 3. By doing so, as there is no need to simulate all machining steps, it is possible to improve the certainty of the machining, while suppressing degradation in machining efficiency.

It is also possible to program a simulation start code in the NC program so that a simulation processing is started at the timing when replacing the tool 32. By doing so, even for a case, as described above, where the correction of the installation is performed by the user when replacing the tool 32, it is possible for the user to verify, by simulating operation of the machine tool 3, whether or not there is any error in the NC program or the inputted set values in the use of the replaced tool 32. Besides, it is possible for the user to verify an operation at any time when the set value is changed, or the like.

By using unused M codes (e.g., M100) or the like as the simulation start code and the simulation end code, it is possible to implement the present embodiment without changing the in-use NC code significantly. That is, it is possible to implement the present embodiment without changing the current system significantly.

In addition, according to the present embodiment, by performing the specified tool distance processing when the tool distance becomes less than or equal to the specified tool distance, it is possible to verify the tool 32 before staring actual machining.

Further, if the distance from the attached position of the tool 32 to the workpiece 31 is long, there is a case where the user may not be able to measure a distance between the tool 32 and the workpiece 31. In such a case, by setting a "stop" as the specified tool distance processing, the user measures the distance between the workpiece 31 and the tool 32 using a scale or the like. By doing so, it is possible to verify whether or not the distance between the tool 32 and the workpiece 31 is significantly different from the projected distance to be stopped, thus preventing an operation error.

Furthermore, when the machine tool 3 is large, a braking distance of the tool 32 becomes long when the machine tool 3 is stopped. Therefore, by setting the minimum distance in the present embodiment as a distance in consideration of the braking distance of the machine tool 3, it is possible to stop the machine tool 3 in consideration of the braking distance even for a case when the machine tool 3 is large.

Moreover, when attaching the tool 32, the tool 32 is attached at a position shifted from the stop position then, after the machine tool controller 2 returns the tool 32 to the stop position, machining is resumed, but at this time, if there is an error in attaching the tool 32 or in the type of the tool 32, interference may occur.

Here, by setting the minimum distance larger, it is possible to prevent interference in a case where there is an error in attaching the tool 32 or in the type of the tool 32.

In addition, there is a case where an error is included in the set value, and very small interference may occur due to the error. As in the present embodiment, by performing the specified tool distance processing when the tool distance becomes less than or equal to the minimum distance, it is possible to prevent interference caused by such errors.

Further, by prohibiting the processing from proceeding to the next step without following the procedure displayed in the machining preparation information input screen 300 as in the present embodiment, it is possible to improve the certainty of the procedure, and also to educate the user.

Furthermore, by allowing a dead band to be specified by parameter, it is possible to set a flexible dead band.

It should be noted that the present invention is not limited to the above embodiments, and various modifications may be included.

For example, if the simulation start code is programmed at the beginning of the NC program and the simulation end code is programmed at the end of the NC program, it is possible to start actual machining after simulating the entire NC program.

Alternatively, an M code that simulates the entire NC program before machining (e.g., M102) may be set in the simulated portion.

Further, there is a distinction in the present embodiment between the minimum distance and the specified tool distance, but both may be the same.

It should be noted that the embodiments hereinabove are described in detail in order to better illustrate the invention, and not intended to necessarily limit to have all configurations that have been described. Also some of the configurations of the present embodiment may be added with another one, removed, or replaced with another one.

Further, some or all of the components, functions, the processing unit 110, the units 111-113, the storage device 160 and so forth in the machining support apparatus 1 may be embodied in hardware, for example, by designing an integrated circuit. Alternatively, as shown in FIG. 2, aforesaid components and functions in the machining support apparatus 1 may be embodied in software by a processor such as a CPU interpreting and executing a program to realize respective functions. Information for realizing respective functions, such as programs, tables and files, can be stored, other than on a hard disk, in a recording device such as a memory and an SSD (Solid State Drive), or in a recording medium such as an IC (Integrated Circuit) card, an SD (Secure Digital) card, and a DVD (Digital Versatile Disc).

In addition, control lines and information lines shown in each embodiment are what are considered to be necessary for description, and all control lines and information lines of the product are not necessarily shown. In fact, almost all components may be connected with one another.

What is claimed is:

1. A machining support apparatus comprising:
 a programmable controller that stores a machining program, including a simulation start code and a simulation end code;
 a machining navigation unit that transmits the machining program to the programmable controller;
 a machining monitoring unit, which, upon receiving a notification via a communication unit from the programmable controller controlling a machine tool, indicating a detection of the simulation start code programmed in the machining program, renders the programmable controller to stop the machine tool;
 a machine tool controller that instructs the programmable controller to stop machining and stop the machine tool;
 a simulation processing unit, which simulates instructions in the machining program from the simulation start code to a simulation end code while the machine tool is stopped; and
 a display unit, which displays a simulated operation of the machine tool while the machine tool is stopped, performed in the simulation processing unit.

2. The machining support apparatus according to claim 1, wherein the simulation start code and the simulation end code are unused codes among codes used in a machining program.

3. The machining support apparatus according to claim 1, wherein a predetermined set distance is set in the machining support apparatus, and the machining monitoring unit monitors a distance between a workpiece and a tool, and performs a predetermined processing when the distance between the workpiece and the tool becomes less than or equal to the predetermined set distance.

4. The machining support apparatus according to claim 3, wherein the predetermined processing is configured to stop an operation of the machine tool.

5. The machining support apparatus according to claim 1, wherein a size of a tool is specified smaller than an actual size thereof, in the machining support apparatus, the tool has parameters that affect machining, and the size of the tool can be specified for each of the parameters of the tool.

6. The machining support apparatus, according to claim 1, wherein the machining navigation unit, at a predetermined machining stage during machining, displays information about procedures necessary to perform the machining stage, and the next machining stage is not allowed to proceed unless information indicating that all procedures have been completed is inputted via an input unit.

* * * * *